United States Patent
Faulkner

(10) Patent No.: US 6,538,069 B2
(45) Date of Patent: Mar. 25, 2003

(54) POLYMER BLENDS OF PVDF THERMOPLASTICS BLENDED WITH FKM FLUOROELASTOMERS

(75) Inventor: Roger Faulkner, Whitman, MA (US)

(73) Assignee: IMMIX Technologies, Inc., Hanover, MA (US)

( * ) Notice: Subject to any disclaimer, the term of this patent is extended or adjusted under 35 U.S.C. 154(b) by 0 days.

(21) Appl. No.: 09/874,753

(22) Filed: Jun. 5, 2001

(65) Prior Publication Data

US 2003/0022997 A1 Jan. 30, 2003

Related U.S. Application Data

(60) Provisional application No. 60/209,447, filed on Jun. 5, 2000.

(51) Int. Cl.[7] .............................................. C08L 27/12
(52) U.S. Cl. ........................................................ 525/199
(58) Field of Search ......................................... 525/199

(56) References Cited

U.S. PATENT DOCUMENTS 3,894,118 A * 7/1975 Aronoff et al. ............. 428/379

FOREIGN PATENT DOCUMENTS

WO    WO 99/61227    12/1999

OTHER PUBLICATIONS

A.M. Krupnik, A.O. Grigorov, Yu.A. Zaichenko, S.E. Osipova, A.B. Sazhina and K.A. Vylegzhanina, Phase structure and properties of blends of polyvinylidene fluoride and SKF–26 fluororubber, Nov. 8, 1989, p. 27 (translation found in *International Polymer Science and Technology*) 17(1).

* cited by examiner

*Primary Examiner*—Nathan M. Nutter
(74) *Attorney, Agent, or Firm*—Mirick, O'Connell, DeMallie & Lougee, LLP

(57) ABSTRACT

A moldable, extrudable, thermally crosslinkable composition of matter containing 50–99% by weight fluoropolymers, in which 50–95% of the polymer content of the blend is an FKM fluoroelastomer and 5–50% of the polymer content of the blend is one or more thermoplastic PVDF polymers or copolymers containing at least 70% by weight vinylidene fluoride monomer units, and the crosslinked articles derived from processing and curing the subject composition of matter.

23 Claims, 2 Drawing Sheets

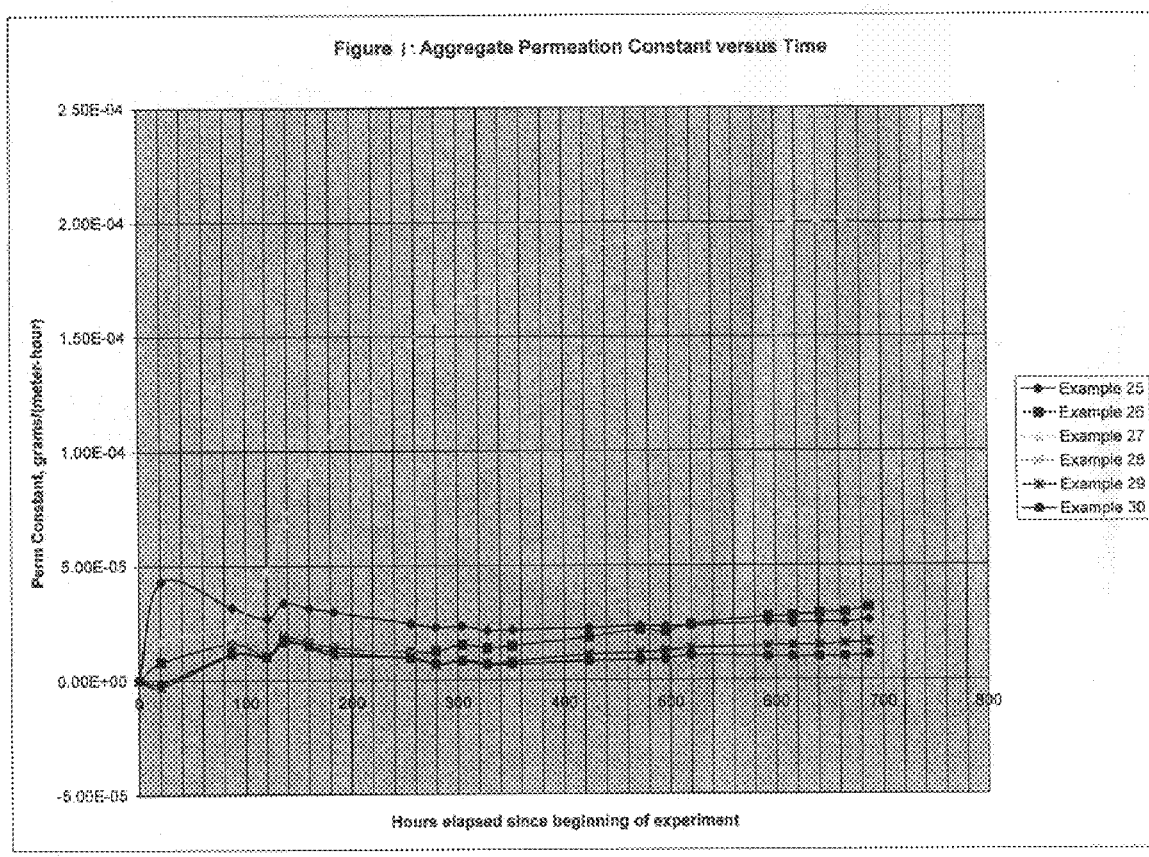

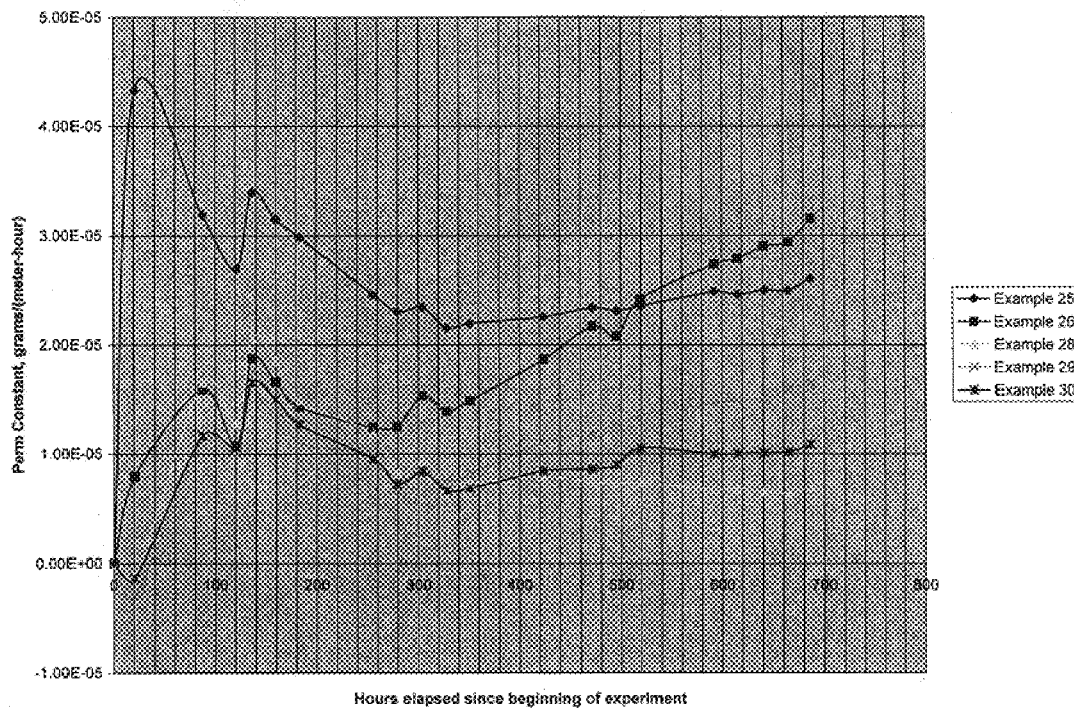

POLYMER BLENDS OF PVDF THERMOPLASTICS BLENDED WITH FKM FLUOROELASTOMERS

CROSS REFERENCE TO RELATED APPLICATION

This application claims priority of Provisional application serial No. 60/209,447, filed on Jun. 5, 2000.

FIELD OF THE INVENTION

This invention relates to polymer blends of PVDF thermoplastics with FKM fluoroelastomers.

BACKGROUND OF THE INVENTION

Rubber/plastic blends are known in the prior art. Prominent examples include the blends of nitrile/butadiene copolymer rubber (NBR) with polyvinylchloride (PVC), and blends of styrene/butadiene copolymer rubber (SBR) with so-called "high-styrene resins" (which are styrene/butadiene copolymers with typically 20% or less butadiene). In some cases, the plastic phase of a rubber/plastic blend may co-crosslink with the rubber phase, as in blends of SBR with high-styrene resins. Blends in which the plastic phase does not crosslink or graft with the elastomer phase are also useful, as in the case of NBR/PVC blends.

Rubber/plastic blends of FKM with "THV" polymers from Dyneon are also known in the prior art. THV polymers are copolymers of tetrafluoroethylene (TFE), hexafluoropropene (HFP), and vinylidene fluoride (VDF), with VDF content well below 50% by weight. Such blends have been used in fuel-containment applications, such as fuel lines and fuel filler neck hoses.

FKM/PVDF and FKM/THV blends in which the FKM is present as crosslinked particles are also known in the prior art. This is believed to be the foundation of the "Fluoroprene" product line from Freudenberg NOK. See, for example, the paper by Craig Chmielewski, "Fluoroprene: Freudenberg NOK's new Fluorinated TPV," presented at the Performance Elastomers & TPEs 2001 seminar in Cleveland, Ohio May 14–15, 2001. Note that in such dynamically cured blends, the FKM phase is crosslinked and does not flow per se, which is quite different than the case of the present invention.

SUMMARY OF THE INVENTION

The invention is a moldable, extrudable, crosslinkable composition of matter involving at least two flowable, non-crosslinked polymer phases, wherein Phase 1 is composed primarily of an FKM fluoroelastomer and Phase 2 is composed primarily of a PVDF thermoplastic copolymer, plus crosslinking agents for the FKM fluoroelastomer. The invention also applies to the partially crosslinked articles that are derived from thermally crosslinking the above compositions. The FKM fluoroelastomer of Phase 1 is a copolymer of vinylidene fluoride, hexafluoropropene, and optionally also tetrafluoroethylene and/or various perfluorovinylethers, and/or various cure site monomers, which we shall refer to generically as "FKM." Component 2 is a PVDF homopolymer or a copolymer of vinylidene fluoride with one or more co-monomers, including specifically hexafluoropropene (PVDF/HFP copolymers), tetrafluoroethylene (PVDF/TFE copolymers), and chlorotrifluoroethylene (PVDF/CTFE copolymers). The crosslinking agents used for the FKM may or may not also react with the PVDF.

The blends of this invention are shaped by molding, extrusion, or other methods of processing to final shape, usually but not necessarily below 140 degrees C. After shaping, the blends are thermally cured, usually but not necessarily at a temperature above 140 degrees C. In most cases, but not necessarily, the blends of this invention must be under pressure during curing to avoid blisters. The maximum practical cure temperature for the blends of this invention is often limited by the tendency of the cured parts to blister when the mold is opened (due to the sudden pressure decrease).

The FKM component of the blends of this invention can be crosslinked by any method known in the prior art, such as for example diamines or diamine-releasing chemicals, bisphenol cure systems, or peroxide cure systems. Cure systems that release minimal amounts of volatile compounds are preferred over cure systems that release a lot of volatile compounds, because volatile compounds lead to blistering.

Weight % fluorine in FKM is a critical variable that impacts especially resistance to swelling by hydrocarbons and permeation by fuels. Insofar as the FKM-rich Phase 1 forms the major part of the blends of this invention, it is vital to choose a high-fluorine content FKM if one wishes to obtain a high permeation resistance. Because of the importance of permeation resistance, a particular bisphenol-crosslinkable high fluorine-content FKM (Dai-El G-621, which contains 71.5% fluorine, approximately) has been used in most of the experiments performed in developing the present invention. The process of this invention is equally applicable to blends of PVDF and/or PVDF copolymers with other commercially significant grades of FKM, containing 65–73% combined fluorine, such as dipolymers of vinylidene fluoride with hexafluoropropene (e.g., Viton A from DuPont), low-temperature grades of FKM containing perfluorovinylether monomer residues, and/or various peroxide crosslinkable FKMs containing labile bromine or iodine, or vinyl groups.

The compositions of this invention may also contain additional components, such as fillers, fibers, pigments, and processing aides. A particularly useful group of examples of this invention comprise electrically conductive moldable, extrudable, crosslinkable compositions of matter in which an effective level of conductive carbon black and/or combinations of carbon black with larger particle size conductive fillers (such as graphite, silicon carbide, metal powders, or metal-coated mineral fillers) is mixed with the FKM/PVDF blend. Admixing of conductive carbon black into such a conductive blend may occur either simultaneously with formation of the blend, or the conductive carbon black may be pre-incorporated into the PVDF prior to mixing the PVDF with the FKM.

This invention features a moldable, extrudable, thermally crosslinkable composition of matter blend comprising about 50–99% by weight fluoropolymers, in which about 50–95% of the polymer content of the blend is an FKM fluoroelastomer and about 5–50% of the polymer content of the blend is one or more thermoplastic PVDF polymers or copolymers containing at least about 70% by weight vinylidene fluoride monomer units, and the crosslinked articles derived from processing and curing the subject composition of matter.

The composition may comprise one or more PVDF/HFP copolymers at a total level between 10–45% by weight of the polymer content of the blend. The composition may comprise a PVDF/CTFE copolymer at a level between 10–45% by weight of the polymer content of the blend. The composition may comprise a PVDF/HFP copolymer at a level between 10–44.5% by weight of the polymer content of the blend and a minor portion of a PVDF/CTFE copolymer at a level between 0.5–5% of the polymer content of the blend. The composition may comprise a PVDF/HFP copolymer at a level between 10–44.5% by weight of the polymer content of the blend and a minor portion of a THV copolymer with a melting temperature below 150° C., at a level between 0.5–5% of the polymer content of the blend.

The composition may further comprise one or more platy fillers selected from the group of such fillers consisting of mica, talc, clay, and delaminated graphite, to accomplish a low-permeability composition. The platy filler may be composed at least in part of mica, talc, or clay which has been treated with an aminosilane.

The composition may comprise a PVDF/HFP copolymer at a level between 10–45% by weight of the polymer content of the blend, optionally a fluoroplastic processing aid at a level up to 5% by weight of the polymer, with the balance of the polymeric portion of the composition consisting of a high-fluorine FKM polymer, containing at least 71% by weight fluorine.

The composition may further comprise at least two conductive fillers of different size and shape, to accomplish electrical resistivity below $10^6$ ohm-cm. The conductive fillers may comprise 2–4% by volume of a platy conductive filler selected from the group consisting of graphite powder, metal-coated mica, and metal flakes, plus 5–8% by volume of an electrically conductive carbon black which has at most 120 $m^2$/gram BET surface area. The composition may further comprise a platy filler selected from the group consisting of mica, talc, clay, and delaminated graphite. The platy filler may be composed at least in part of mica, talc, or clay that has been treated with an aminosilane. The composition may further comprise one or more types of oligomeric poly-CTFE as a processing aid.

The FKM may be a peroxide-crosslinkable elastomer, and the composition may further comprise a free radical generating initiator and optionally a coagent. The FKM may be a peroxide-crosslinkable low-temperature FKM elastomer. The FKM may be a labile iodine-containing peroxide-crosslinkable FKM elastomer. The FKM may be a high-fluorine material with greater than 72% combined fluorine by weight. The composition may further comprise about 0.2–4 parts of a zinc salt of one or several fatty acids. The composition may comprise a PVDF/HFP copolymer at a level between 10–44.5% by weight of the polymer content of the blend, a conductive carbon black, and a minor portion of a THV copolymer with a melting temperature below 150° C., at a level between 0.5–5% of the polymer content of the blend.

BRIEF DESCRIPTION OF THE DRAWINGS

FIG. 1 is a plot of measured permeation constants for the six compounds of table 4 as a function of time; and FIG. 2 is a re-plot of data from FIG. 1 for the five compounds that are based on 71% fluorine FKMs.

DETAILED DESCRIPTION OF THE PREFERRED EMBODIMENTS

Copolymers of vinylidene fluoride (VDF) with hexafluoropropene (HFP) in which 70% or more of the polymer weight is derived from vinylidene fluoride are well known in the prior art. These polymers retain significant crystallinity due to PVDF domains, unlike FKM elastomers, which have lower levels of vinylidene fluoride units. Such PVDF/HFP thermoplastic copolymers are available from Ausimont, Solvay, and Elf Atochem for example. Such copolymers contain the same two monomers that make up the major portion of FKM, and also contain the same type of cure site that is present in bisphenol-curable FKM elastomers, though at a lower concentration than is found in typical FKM polymers. PVDF/HFP copolymers with HFP content between 10–15% by weight, in conjunction with bisphenol-cured FKM elastomers and the cure systems for the FKM, have been found to be particularly desirable embodiments of the present invention.

PVDF/HFP copolymers are believed to covulcanize to some extent with FKM via the bisphenol cure system, whereas PVDF/TFE and PVDF/CTFE copolymers are not believed to covulcanize via the bisphenol cure mechanism. Thus, PVDF/CTFE copolymers remain fluid at the end of a bisphenol cure cycle, whereas PVDF/HFP become somewhat grafted to the FKM phase. The practical result is that FKM/PVDF blends containing primarily PVDF/CTFE polymers are prone to blistering after vulcanization by the bisphenol cure system, whereas FKM/PVDF blends containing primarily PVDF/HFP polymers do not blister until a higher cure temperature is applied. (Blistering in the bisphenol cure system is caused mainly by steam, which is a byproduct of the vulcanization chemistry. Use of a purely $MgO/Mg(OH)_2$ activation system in a bisphenol-cured FKM decreases the tendency to blister somewhat. Uncured molten polymer creates a weak point where a steam bubble can nucleate.)

Note that neither PVDF homopolymer nor any of the known PVDF copolymers crosslink via peroxide/coagent crosslinking. Peroxide-crosslinkable FKM is also more expensive than bisphenol-crosslinkable FKM of comparable properties, so blends of this invention involving peroxide-crosslinkable FKM are more expensive than blends based on comparable bisphenol-cure grades of FKM. Blends of PVDF with peroxide-crosslinkable FKM are still useful, however, in that certain key properties, such as very good low temperature properties for example, are only available with peroxide-cure grades of FKM.

Blends of bisphenol-cured FKM with high levels (more than 5% of the total polymer) of PVDF/CTFE must be cured at rather low temperatures to avoid blistering. Since this necessarily entails longer cure times, PVDF/CTFE copolymers are not usually preferred as the sole basis for FKM/PVDF blends in which a bisphenol cure is used to crosslink the FKM. This may be due to the inertness of PVDF/CTFE copolymers towards the bisphenol cure system, or it could be that PVDF/CTFE polymers provide better conditions for bubble nucleation. It has been found however, that low addition levels of either PVDF/CTFE copolymers or low-melting THV copolymers are desirable as additives to FKM/(PVDF/HFP) blends which are crosslinked via the bisphenol cure mechanism.. Addition of either THV 220 (from Dyneon, LLC) or Solef 31508 or Solef 32008 (PVDF/CTFE copolymers) to blends of FKM/(PVDF/HFP) lowers ML (the minimum torque observed in an oscillating disk rheometer curve) substantially, and improves processability.

It has also been observed that Solef 31508 or Solef 32008 (PVDF/CTFE copolymers) strongly inhibit the bisphenol cure system for FKM, so that blends of this invention of FKM with PVDF/CTFE copolymers must use either a diamine cure system or peroxide-crosslinkable FKMs. (The reason such blends are appealing is that Solef 31508 and Solef 32008 have excellent low-temperature flexibility compared to PVDF/HFP or THV polymers of comparable crystallinity.)

Additional highly desirable versions of the novel blends of the present invention are electrically conductive compounds in which a conductive carbon black is first dispersed into the PVDF. Subsequently the PVDF/carbon black mixture is admixed with FKM and additional compounding ingredients. It has been found that certain blends prepared this way have higher electrical conductivity and a smoother texture indicating superior mixing of the polymer phases compared to compositionally identical blends in which the carbon black is added to the FKM/plastic mixture as the mixture is being formed. In order for this methodology to work, the conductive carbon blacks employed must be capable of withstanding the high shear forces generated during compounding of the PVDF/carbon black masterbatch. It has been found that high surface area carbon blacks such as the various grades of Ketchenblack from Akzo, or Cabot's Black Pearls 2000 are significantly mechanically degraded during mixing of a PVDF/carbon black masterbatch. Also, these same high surface area carbon blacks have been found to substantially slow down the bisphenol cure of FKM/PVDF blends compared to lower surface area carbon blacks. Therefore, high structure, relatively low surface area (less than 100 meter$^2$ per gram BET nitrogen surface area) conductive carbon blacks such as Ensaco 250 (from MMM Carbon Company) have been found to work much better in the electrically conductive versions of the invention than high surface area conductive carbon blacks (which are mechanically degraded during mixing to a greater extent than low surface area blacks).

Additional highly desirable versions of the novel blends of the present invention are those which use oligomeric poly(chlorotrifluoroethylene) ("poly-CTFE" herein, CAS number 9002-83-9) as a processing aid. Compared to other processing aids that are highly fluid at typical molding/extruding temperatures (100–130° C.), oligomeric poly-CTFE produces compositions with lower permeability.

TABLE 1

Polymers used in Examples

| Polymer name used in application | Trade name and description of key polymer properties |
|---|---|
| FKM #1 | Dai-El G-621, 71% fluorine FKM, 50 Mooney viscosity, bisphenol/phosphonium cure incorporated, with medium bispenol level; designed for molded goods. |
| FKM #2 | Fluorel E-15128, 71% fluorine FKM, 30 Mooney, bisphenol/phosphonium cure incorporated, with relatively low bisphenol level; designed for hoses. |
| FKM #3 | Fluorel FT 2320, 70% fluorine FKM, 20 Mooney, bisphenol/phosphonium cure incorporated, with medium bisphenol level; designed for molded goods. |
| FKM #4 | Fluorel FC 2152, 66% fluorine FKM, 50 Mooney, bisphenol/phosphonium cure incorporated, with relatively low bisphenol level; designed for diaphragms. |
| FKM #5 | Fluorel FC 2260, 66% fluorine FKM, 60 Mooney, peroxide crosslinkable, with labile bromine cure sites. |
| FKM #6 | Dai-El G-999, 73% fluorine FKM, 35 Mooney at 100° C., peroxide crosslinkable, with labile iodine cure sites. |
| FKM #7 | Dai-El LT-302, 30 Mooney, 65% fluorine low-temperature FKM, 30 Mooney, peroxide crosslinkable, with labile iodine cure sites. |
| FKM #8 | Viton GFLT-502, 70% fluorine FKM, 50 Mooney, peroxide crosslinkable, with both labile bromine & iodine cure sites. |

TABLE 1-continued

Polymers used in Examples

| Polymer name used in application | Trade name and description of key polymer properties |
|---|---|
| PVDF #1 | Hylar FXH PVDF/HFP copolymer with 5–6% HFP, melting temperature 155–160° C., Melt Flow Index 1–4 (10 kilo load) |
| PVDF #2 | Solef 31508 PVDF/CTFE copolymer with about 15% CTFE, melting temperature 150–169° C., Melt Flow Index 15–25 |
| PVDF #3 | Solef 21508 PVDF/HFP copolymer with about 15% HFP, melting temperature 130–135° C., Melt Flow Index 4–8 |
| PVDF #4 | Kynar 740A PVDF homopolymer, melting temperature 165–170° C., Melt Flow index 15–25 |

Notes for Table 1:
Mooney viscosities cited above are based on the large rotor, value after 1 minute preheat plus 10 minutes run time. Run temperature is 121° C., unless otherwise specified.
Melting temperature data are per ASTM D4318.
Melt Flow Index data on PVDF polymers measured with 5-kilogram load at 232° C., unless a different load is specified.
Dai-El is a trademark of Daikin America, Hylar is a trademark of Ausimont, Fluorel is a trademark of Dyneon, Viton is a trademark of DuPont, Solef is a trademark of Solvay, and Kynar is a trademark of Elf Atochem.

EXAMPLES

Table 2 shows several typical embodiments of the present invention. In Example 1 (lab book #RF3-7-2), PVDF #1 is Banbury-mixed with a conductive grade carbon black and high-fluorine bisphenol-curable FKM #1 in a first stage mix, followed by addition of calcium hydroxide and magnesium oxide in a second-stage mix. In the absence of any processing aides, this composition is quite viscous, as shown by the high ML (40.2 inch-pounds). Although this compound was difficult to process, it had useful mechanical properties.

Examples 2–5 demonstrate that various polymeric, fluorine-containing processing aides can dramatically lower ML compared to Example 1.

Example 2 (lab book #RF3-8-2) shows that 2.04 phr (parts per hundred polymer) of oligomeric poly-CTFE (Halocarbon 200 oil from Halocarbon Products Corporation) lowers ML dramatically, increases the scorch delay, and speeds up the crosslinking reactions. This particular processing aid also has a positive effect on permeation rate compared to various hydrocarbon plasticizers tested.

Example 3 (lab book #RF3-8-4) shows that 2.04 phr (parts per hundred polymer) of THV-220 also reduces ML dramatically, without slowing the cure or speeding up the scorching process.

Example 4 (lab book #RF3-8-5) shows that 2.0 phr (parts per hundred polymer) of THV-220 plus 2.0 phr of poly-CTFE oligomer also reduces ML dramatically, with very little effect on cure rate. There is however no evidence of synergism between THV 220 and poly-CTFE oligomer.

Example 5 (lab book #RF3-6-4) demonstrates that a combination of poly-CTFE and zinc stearate produces a very unusual and highly desirable cure profile in which a long scorch delay is combined with a fast cure. This is especially important for the FKM/PVDF blends of the present invention because such blends must be mixed, extruded, and/or molded at higher temperatures than are conventional for non-plastic-containing FKM, and so better scorch safety is highly desirable.

Examples 6–12 of Table 2 show the effects of various conventional processing aids on the same basic FKM/PVDF formula used in Examples 1–5. Example 6 shows that only 0.68 phr of zinc stearate dramatically reduces ML, while extending scorch delay (compared to Example 1). A variety of other conventional processing aids and combinations thereof were also evaluated, with little advantage seen over zinc stearate (Examples 7–12).

Examples 7–9 show that both PEG 400 (polyethylene glycol of average molecular weight 400 daltons) and TP-95 (di(butoxy-ethoxy-ethyl)adipate) cause an acceleration of cure rate, which can be opposed effectively by zinc stearate. Separate experiments indicate that these polyether materials also cause an unacceptable rate of curing during storage. PEG 400 is thought to be the primary cause of the high ML of Example 9, having caused a substantial degree of crosslinking during mixing, though Halocarbon 200 oil could also be synergistic in this regard. (Example 9 is replicated; see Table 3, Example 20.)

Examples 10–12 of Table 2 show the effects of three particular processing aides that are often used in oil-resistant elastomers, each used in conjunction with 0.68 phr of zinc stearate. Example 10, using 1.36 phr of Vanfre AP-2 (from R. T. Vanderbilt Company) has the same sort of extreme scorch delay and relatively fast cure as Example 5. Example 11, using 1.36 phr of Struktol WB-222 (from Struktol Company of America), cures faster and with less scorch delay compared to Example 10. Example 12, using 1.36 phr of TOTM (trioctyltrimellitate), has greater elongation to break compared to Example 10 (or any other compound presented in Table 2).

Table 3 shows a variety of formulations of the present invention which are intended to be electrically conductive to an extent which is adequate for electrostatic dissipation (ESD). Several alternative methods to measure electrical conductivity are known; we used the surface microprobe from Prostat, Inc. (PRS-801, consistent with ESD Association standard 11.11). The microprobe was used to measure conductivity at least 5 times on different portions of the sample. The raw data were analyzed by calculating the mean and standard deviation of the raw data; this information is included in the tables where it was measured. Second, an estimate of the maximum resistance which can reliably be guaranteed for the particular sample is calculated as (mean resistance+3(standard deviation of resistance)). For ESD applications, it is conventional to require a maximum resistance of $10^8$ ohm-cm. Several of the compounds of Table 3 meet this target maximum resistance level.

Examples 13–16 of Table 3 show a series of compounds with increasing levels of THV-220. All these compounds had adequate electrical conductivity. There is some evidence that THV-220 enhanced conductivity, compared to other similar formulae without THV; there appears to be an optimum THV-220 level around 3 phr based on these experiments.

Example 17 shows that TP-95 (di(butoxy-ethoxy-ethyl) adipate) is a potent cure accelerator. It is believed that the multiple ether linkages of TP-95 serve to solvate calcium ions, therefore increasing the reaction rate of $Ca(OH)_2$ with the FKM, which is a vital step in the sequence of reactions leading to FKM vulcanization. The increased ML of Example 17 versus Example 13 clearly shows that the curing process has occurred to some extent during mixing.

Comparing Example 18 and/or Example 19 to Example 20 shows the effect of adding a high-surface area conductive carbon black (Ensaco 350) to a formulation containing 8.15 phr of Ensaco 250. This substitution increased conductivity, but no more than simply increasing the level Ensaco 250 (compare Example 18 to Example 22; even in the presence of 20 phr of talc, conductivity of Example 22 was nearly equal to that of Example 18). In the particular case of Example 18, the Ensaco 350 was added as the very last ingredient, under conditions where the PVDF plastic phase did not fully melt during processing; this is believed to have caused an increase of ML. In the particular case of Example 19, the Ensaco 350 was added into the first stage mix, under conditions where the PVDF plastic phase did fully melt during processing; this leads to a lower ML.

Comparing Example 19 to Example 23, it is clear that the high surface area conductive carbon black, Ensaco 350, strongly inhibits the bisphenol cure. This could in principle be due to sulfur content of Ensaco 350, but this should not be true based on the manufacturer's data. Therefore, the bisphenol cure inhibition of Ensaco 350 and other high surface area carbon blacks is thought to be due to adsorption of one or more ingredients (such as bisphenol or phosphonium accelerator) onto the carbon black surface.

Example 19 is very similar to Example 18 without the Halocarbon 200 oil, but in this case both the Ensaco blacks (250 & 350) were incorporated into a masterbatch of rubber and plastic in a high-temperature blending step prior to incorporation of the $Ca(OH)_2$ and MgO. It is surprising that this small change of recipe, together with the change of mix method caused such a large change in cure rate. (Example 19 did not crosslink to a normal extent in 12 minutes, and was still in the early stages of curing when the experiment was terminated.) It is also possible that the Halocarbon 200 oil had a profound effect on the cure rate, and in this case the observed difference in the ML could be more due to a degree of scorching in Example 18 as opposed to the Ensaco 350 per se.

Example 20 apparently scorched during mixing. This compound includes both Halocarbon 200 and PEG 400, and is a replicate of Example 9.

All the examples up to and including Example 21 were prepared by first mixing a masterbatch of FKM, conductive carbon black, and PVDF at a temperature above the softening point of the FKM. This masterbatch was subsequently admixed with the remaining compounding ingredients, including $Ca(OH)_2$ and MgO, in a final stage mixing operation. These intermediate masterbatches are not explicitly shown for Examples 1–20 in the tables, but Example 23 of Table 3 is the specific intermediate masterbatch used in preparing Example 21.

Example 22 was prepared differently than Example 21, though it is compositionally identical. In preparing Example 22, all the conductive carbon black for the entire batch was first mixed with the PVDF plastic, as shown in masterbatch Example 24. Then, this plastic/carbon black MB was mixed with the FKM and some additional compounding ingredients in a second masterbatch (compositionally identical to Example 23). Comparing Examples 21 and 22 shows the effect of pre-dispersing the conductive carbon black into the PVDF plastic prior to making the hot blend of PVDF and FKM (Example 23). The largest effect of the modified mix procedure is on the conductivity, which is higher by a factor of more than one million for the version (Example 22) prepared by first pre-dispersing the carbon black into the PVDF before forming the blend.

Examples 21 and 22 contain aminosilane-grafted talc as reinforcing and permeation-limiting filler. It has been found that ordinary talc inhibits the cure of high-fluorine FKMs like FKM #1 and FKM #2 used in most of the experiments cited in the tables of this application, whereas aminosilane-grafted talc does not inhibit the cure. This cure inhibiting effect is not seen for lower fluorine FKMs such as FKM #3.

Table 4 shows recipes, physical properties, and permeability to fuel for a set of compositions of this invention compared to a prior art compound, WG-7-29-33 (Example 25), which is also an elastomer/plastic blend based on FKM #2 blended with THV-500. Example 25 is considered a state-of-the-art elastomer compound for resistance to fuel permeation. The particular permeability numbers reported in Table 4 were developed for replicate samples of each compound, and represent averaged data for a long-term experiment from 592–665 hours.

The permeation measurements reported in Table 4 were performed by the gravimetric method described in SAE Technical Paper 2000-01-1096, using Thwing-Albert permeation cups at room temperature (21±1° C.). The permeant used in these experiments was CM15, ASTM Reference Fuel C+15% methanol (one of several industry standards). The measured permeation constants for the six compounds of Table 4 are shown in FIG. 1 as a function of experimental time. The one compound that has much higher permeation than the other five is Example 27 (RF3-15-4), which is based on 70% fluorine FKM #3, whereas all the other compounds are based on 72% fluorine FKMs. FIG. 1 shows why the reported data in Table 2 was selected as an average of data from 592–665 hours; the calculated permeation constants showed a lot of variation in the early data, but became stable after an extended permeation time.

FIG. 2 replots the data for the five compounds of Table 4 that are based on 71% fluorine FKMs. Removing Example 27 (which has much higher permeation rate than the other samples) gives a better comparison of the remaining compounds, which are logically comparable based on the fact that all five of the compounds shown in FIG. 2 are based on 72% fluorine FKMs.

FIG. 2 demonstrates graphically that various compounds of the present invention outperform a state-of-the-art FKM/THV blend. The two lowest-permeability compounds out of the series are Examples 28 and 30, neither of which contains any added non-fluorocarbon processing aids. Comparing these compounds with Example 25, the FKM #2/THV-500 sample (which also does not include any added process aids), Example 28 produced 5 times lower permeation, and Example 30 produced permeation which is lower by a factor of 2 compared to the FKM/THV-500 control.

Comparing Examples 28 and 30, it is clear that adding more PVDF/CTFE copolymer (FKM #2) to the basic composition of Example 28 increased permeability significantly. This seems to imply that the permeability of the FKM/PVDF blends is better than PVDF #2, a pure PVDF/CTFE copolymer. This is rather surprising.

Comparing Examples 26 and 29, which are identical except for using THV-220 in Example 26 and PVDF #2 in Example 29, it appears that even at such a low level (1 phr), a processing additive can significantly affect permeability. It further appears that PVDF/CTFE copolymer is preferable to THV-220 copolymer in terms of permeability of the final compound.

It is instructive to notice that Example 29 had lower permeability than the FKM/PVDF control, even though this compound had a significant amount of non-fluorocarbon additives (which are known to increase permeability). It is believed that in this instance the lower intrinsic permeability of the polymer system, combined with the effect of aminosilanized talc (a platy filler), produced equivalent permeability to the FKM/THV control.

Table 5 presents data on a variety of FKM/PVDF blends of this invention which are designed to show that the invention is also applicable to a range of FKM polymers, and not just to high-fluorine FKMs. Note in particular that good properties have been attained for a variety of compositions in which the FKM cure system is not believed to form crosslinks with the PVDF at all.

TABLE 2

FKM/PVDF Blends
This series reviews data from several different experiments.

| | | Lab book number, recipe in parts per 100 polymer (phr) | | | | | |
|---|---|---|---|---|---|---|---|
| INGREDIENT | lab book #: | RF3-7-2 #1 | RF3-8-2 #2 | RF3-8-4 #3 | RF3-8-5 #4 | RF3-6-4 #5 | RF3-6-2 #6 |
| PVDF #1 (PVDF/HFP copolymer) | | 32.07 | 32.07 | 32.07 | 32.07 | 32.07 | 32.07 |
| FKM #1 | | 67.93 | 67.93 | 67.93 | 67.93 | 67.93 | 67.93 |
| THV-220 (Dyneon) | | — | — | 2.04 | 2.00 | — | — |
| TOTM | | — | — | — | — | — | — |
| Halocarbon 200 oil | | — | 2.04 | — | 2.00 | 2.00 | — |
| Carbowax PEG 400 | | — | — | — | — | — | — |
| TP-95 (di(butoxy-ethoxy-ethyl)adipate) | | — | — | — | — | — | — |
| Zinc stearate | | — | — | — | — | 0.68 | 0.68 |
| Vanfre AP-2 | | — | — | — | — | — | — |
| Struktol WB 222 | | — | — | — | — | — | — |
| EXP-835-73-1 (HiMod 360 mica, aminosilanized) | | — | — | — | — | — | — |
| Ensaco 250 Black Beads | | 8.15 | 8.15 | 8.15 | 8.15 | 8.15 | 8.15 |
| Calcium hydroxide-HP | | 6.11 | 6.11 | 6.11 | 6.11 | 6.11 | 6.11 |
| StarMag CX-150 (MgO) | | 3.40 | 3.40 | 3.40 | 3.40 | 3.40 | 3.40 |
| Total: | | 117.65 | 119.69 | 119.69 | 121.66 | 120.33 | 118.33 |
| Calculated Specific Gravity: | | 1.862 | 1.903 | 1.903 | 1.903 | 1.894 | 1.893 |

TABLE 2-continued

FKM/PVDF Blends
This series reviews data from several different experiments.

| INGREDIENT | lab book #: | RF3-7-3 #7 | RF3-7-5 #8 | RF3-7-4 #9 | RF3-6-6 #10 | RF3-6-8 #11 | RF3-6-11 #12 |
|---|---|---|---|---|---|---|---|
| PVDF #1 (PVDF/HFP copolymer) | | 32.07 | 32.07 | 32.07 | 32.07 | 32.07 | 32.07 |
| FKM #1 | | 67.93 | 67.93 | 67.93 | 67.93 | 67.93 | 67.93 |
| THV-220 (Dyneon) | | — | — | — | — | — | — |
| TOTM | | — | — | — | — | — | 1.36 |
| Halocarbon 200 oil | | — | — | 1.36 | — | — | — |
| Carbowax PEG 400 | | 0.68 | — | 0.68 | — | — | — |
| TP-95 (di(butoxy-ethoxy-ethyl)adipate) | | — | 1.36 | — | — | — | — |
| Zinc stearate | | 1.36 | 0.68 | — | 0.68 | 0.68 | 0.68 |
| Vanfre AP-2 | | — | — | — | 1.36 | — | — |
| Struktol WB 222 | | — | — | — | — | 1.36 | — |
| EXP-835-73-1 (HiMod 360 mica, aminosilanized) | | — | — | — | — | — | — |
| Ensaco 250 Black Beads | | 8.15 | 8.15 | 8.15 | 8.15 | 8.15 | 8.15 |
| Calcium hydroxide-HP | | 6.11 | 6.11 | 6.11 | 6.11 | 6.11 | 6.11 |
| StarMag CX-150 (MgO) | | 3.40 | 3.40 | 3.40 | 3.40 | 3.40 | 3.40 |
| Total: | | 119.69 | 119.69 | 119.69 | 119.69 | 119.69 | 119.69 |
| Calculated Specific Gravity: | | 1.838 | 1.837 | 1.854 | 1.873 | 1.872 | 1.874 |

| Rheological & Cure Properties | RF3-7-2 | RF3-8-2 | RF3-8-4 | RF3-8-5 | RF3-6-4 | RF3-6-2 |
|---|---|---|---|---|---|---|
| ML | 40.20 | 11.90 | 12.40 | 12.30 | 10.00 | 12.10 |
| MH | 68.80 | 59.20 | 61.80 | 59.00 | 62.80 | 61.50 |
| ts2 | 2.60 | 3.15 | 3.13 | 3.30 | 6.20 | 3.18 |
| t'50 | 4.87 | 4.87 | 4.95 | 4.97 | 8.20 | 5.13 |
| t'90 | 7.38 | 6.07 | 6.22 | 6.30 | 9.38 | 6.42 |
| ODR initial torque | — | — | — | — | — | — |
| Cure system figure of merit (ts2/(t'90-ts2) | 0.54 | 1.08 | 1.01 | 1.10 | 1.95 | 0.98 |

| Rheological & Cure Properties | RF3-7-3 | RF3-7-5 | RF3-7-4 | RF3-6-6 | RF3-6-8 | RF3-6-11 |
|---|---|---|---|---|---|---|
| ML | 11.90 | 12.40 | 47.20 | 11.50 | 10.60 | 10.30 |
| MH | 66.10 | 65.40 | 70.40 | 70.00 | 70.30 | 65.90 |
| ts2 | 4.12 | 3.23 | 2.25 | 5.88 | 4.32 | 4.53 |
| t'50 | 6.20 | 4.77 | 3.35 | 7.75 | 5.95 | 6.20 |
| t'90 | 7.55 | 6.15 | 6.58 | 8.97 | 7.02 | 7.17 |
| ODR initial torque | — | — | — | — | — | — |
| Cure system figure of merit (ts2/(t'90-ts2) | 1.20 | 1.11 | 0.52 | 1.90 | 1.60 | 1.72 |

| Physical Properties | RF3-7-2 #1 | RF3-8-2 #2 | RF3-8-4 #3 | RF3-8-5 #4 | RF3-6-4 #5 | RF3-6-2 #6 |
|---|---|---|---|---|---|---|
| Shore A Durometer | 85 | 93 | 93 | 92 | — | 93 |
| Tensile Strength, pounds/square inch (psi) | 2,217 | 2,148 | 2,147 | 1,738 | — | 2,110 |
| Elongation at break (%) | 228 | 292 | 277 | 188 | — | 286 |
| Stress at 100% Strain (psi) | 1,324 | 1,401 | 1,412 | 1,409 | — | 1,388 |
| Max Electrical Resistance, ohm-cm. (mean + 3 sigma) | no data | 7.6E + 13 | 2.0E + 10 | 2.1E + 10 | no data | 3.7E + 13 |
| Average electrical resistance, ohm-cm. | no data | 1.9E + 13 | 6.1E + 09 | 4.1E + 09 | no data | 5.3E + 12 |
| standard deviation electrical resistance, ohm-cm | no data | 1.9E + 13 | 4.5E + 09 | 5.7E + 09 | no data | 1.1E + 13 |

| Physical Properties | RF3-7-2 #7 | RF3-8-2 #8 | RF3-8-4 #9 | RF3-8-5 #10 | RF3-6-4 #11 | RF3-6-2 #12 |
|---|---|---|---|---|---|---|
| Shore A Durometer | 93 | 90 | — | — | 93 | 91 |
| Tensile Strength, pounds/square inch (psi) | 2,068 | 2,233 | — | — | 1,580 | 2,152 |
| Elongation at break (%) | 310 | 296 | — | — | 212 | 358 |
| Stress at 100% Strain (psi) | 1,325 | 1,406 | — | — | 1,150 | 1,255 |
| Max Electrical Resistance, ohm-cm. (mean + 3 sigma) | 9.9E + 13 | 2.5E + 13 | no data | no data | no data | no data |
| Average electrical resistance, ohm-cm. | 5.7E + 13 | 1.5E + 13 | no data | no data | no data | no data |
| standard deviation electrical resistance, ohm-cm | 1.4E + 13 | 3.2E + 12 | no data | no data | no data | no data |

TABLE 3

FKM/PVDF Blends
This series reviews data from several different experiments.

| | Lab book number, recipe in parts per 100 polymer (phr) | | | | | |
|---|---|---|---|---|---|---|
| INGREDIENT    lab book #: | RF3-8-8 #13 | RF3-8-9 #14 | RF3-8-10 #15 | RF3-8-11 #16 | RF3-8-12 #17 | RF3-13-7 #18 |
| PVDF #1 (PVDF/HFP copolymer) | 31.00 | 31.00 | 31.00 | 31.00 | 31.00 | 32.07 |
| FKM #1 | 68.00 | 68.00 | 68.00 | 68.00 | 68.00 | 67.93 |
| THV-220(Dyneon) | 1.00 | 2.00 | 3.00 | 4.00 | 1.00 | 1.35 |
| Ensaco 250 Black Beads | 12.00 | 12.00 | 12.00 | 12.00 | 12.00 | 8.15 |
| Ensaco 350 Black Beads | — | — | — | — | — | 2.60 |
| Calcium hydroxide-HP | 6.10 | 6.10 | 6.10 | 6.10 | 6.10 | 6.10 |
| StarMag CX-150 (MgO) | 3.40 | 3.40 | 3.40 | 3.40 | 3.40 | 3.40 |
| Total: | 121.50 | 122.50 | 123.50 | 124.50 | 123.00 | 122.95 |
| Calculated Specific Gravity: | 1.900 | 1.901 | 1.901 | 1.902 | 1.880 | 1.901 |

| | Lab book number, recipe in parts per 100 polymer (phr) | | | | | |
|---|---|---|---|---|---|---|
| INGREDIENT    lab book #: | RF3-13-9 #19 | RF3-8-3 #20 | RF3-15-7 #21 | RF3-15-10 #22 | RF3-15-1 #23 | RF3-15-8 #24 |
| PVDF #1 (PVDF/HFP copolymer) | 31.00 | 32.07 | 31.00 | 31.00 | 31.00 | 31.00 |
| FKM #1 | 68.00 | 67.93 | 68.00 | 68.00 | 68.00 | — |
| THV-220(Dyneon) | 1.00 | — | 1.00 | 1.00 | 1.00 | 1.00 |
| Ensaco 250 Black Beads | 8.00 | 8.15 | 11.00 | 11.00 | 11.00 | 11.00 |
| Ensaco 350 Black Beads | 2.60 | — | — | — | — | — |
| Calcium hydroxide-HP | 6.10 | 6.11 | 6.10 | 6.10 | 6.10 | — |
| StarMag CX-150 (MgO) | 3.40 | 3.39 | 3.40 | 3.40 | 3.40 | — |
| Total: | 120.10 | 119.69 | 142.70 | 142.70 | 120.50 | 43.00 |
| Calculated Specific Gravity: | 1.901 | 1.892 | 1.894 | 1.876 | 1.900 | 1.872 |

| Rheological & Cure Properties | RF3-8-8 | RF3-8-9 | RF3-8-10 | RF3-8-11 | RF3-8-12 | RF3-13-7 |
|---|---|---|---|---|---|---|
| ML | 14.90 | 14.30 | 14.40 | 14.00 | 21.20 | 17.50 |
| MH | 54.00 | 53.60 | 53.30 | 53.10 | 59.10 | 62.60 |
| ts2 | 3.20 | 3.30 | 3.33 | 3.80 | 2.12 | 2.48 |
| t'50 | 5.28 | 5.43 | 5.52 | 6.23 | 3.68 | 4.50 |
| t'90 | 6.82 | 6.88 | 7.07 | 7.93 | 5.35 | 6.90 |
| ODR initial torque | — | — | — | — | — | 58.40 |
| Cure system figure of merit [ts2/(t"90-ts2)] | 0.88 | 0.92 | 0.89 | 0.92 | 0.66 | 0.56 |

| Rheological & Cure Properties | RF3-13-9 | RF3-8-3 | RF3-15-7 | RF3-15-10 | RF3-15-1 | RF3-15-8 |
|---|---|---|---|---|---|---|
| ML | 13.50 | 47.80 | 14.5 | 13.6 | 11.50 | 10.60 |
| MH | 23.00 | 71.50 | 50.9 | 50.6 | 70.00 | 70.30 |
| ts2 | 6.63 | 2.23 | 3.52 | 4.13 | 5.88 | 4.32 |
| t'50 | 9.52 | 3.63 | 6.78 | 8.57 | 7.75 | 5.95 |
| t'90 | 11.52 | 6.70 | 11.62 | 13.38 | 8.97 | 7.02 |
| ODR initial torque | 63.50 | — | 58.8 | 59.4 | — | — |
| Cure system figure of merit [ts2/(t"90-ts2)] | 1.36 | 0.50 | 0.54 | 0.99 | 1.90 | 1.60 |

| Physical Properties Example #: | RF3-8-8 #13 | RF3-8-9 #14 | RF3-8-10 #15 | RF3-8-11 #16 | RF3-8-12 #17 | RF3-13-7 #18 |
|---|---|---|---|---|---|---|
| Shore A Durometer | 94 | 95 | 94 | 92 | 92 | 92 |
| Tensile Strength, pounds/square inch (psi) | 1,768 | 1,758 | 1,672 | 1,728 | 1,943 | 2,061 |
| Elongation at break (%) | 274 | 281 | 286 | 254 | 283 | 187 |
| Stress at 100% Strain (psi) | 1,497 | 1,477 | 1,412 | 1,450 | 1,489 | 1,568 |
| Surface res., Maximum ohm-cm. (mean + 3 sigma) | 1.5E + 04 | 2.9E + 05 | 9.0E + 03 | 8.8E + 03 | 1.4E + 08 | 4.4E + 07 |
| Average surface res., ohm-cm. | 4.6E + 03 | 5.7E + 04 | 3.6E + 03 | 2.5E + 03 | 3.0E + 07 | 5.6E + 06 |
| standard deviation resistance, ohm-cm | 3.3E + 03 | 7.6E + 04 | 1.8E + 03 | 2.1E + 03 | 3.5E + 07 | 1.3E + 07 |

| Physical Properties Example #: | RF3-13-9 #19 | RF3-8-3 #20 | RF3-15-7 #21 | RF3-15-10 #22 | RF3-15-1 #23 | RF3-15-8 #24 |
|---|---|---|---|---|---|---|
| Shore A Durometer | — | 93 | 96 | 96 | — | 93 |
| Tensile Strength, pounds/square inch (psi) | — | 2,147 | 1733 | 1669 | — | 1,580 |
| Elongation at break (%) | — | 277 | 142 | 155 | — | 212 |
| Stress at 100% Strain (psi) | — | 1,412 | 1700 | 1618 | — | 1,150 |
| Surface res., Maximum ohm-cm. (mean + 3 sigma) | no data | 6.7E + 13 | 1.9E + 14 | 2.3E + 08 | no data | no data |
| Average surface res., ohm-cm. | no data | 4.9E + 13 | ####### | 1.09E + 0.7 | no data | no data |
| standard deviation resistance, ohm-cm | no data | 6.2E + 12 | ####### | 7.35E + 0.7 | no data | no data |

TABLE 4

FKM/PVDF Blends
This series reviews data from several different experiments for which permeability was measured.

Lab book number, recipe in parts per 100 polymer (phr)

| INGREDIENT | lab book # | WG-7-29-33 #25 | RF3-15-10 #26 | RF3-15-4 #27 | RF3-16-2 #28 | RF3-15-13 #29 | RF3-16-3 #30 |
|---|---|---|---|---|---|---|---|
| PVDF #1 (PVDF/HFP copolymer) | | — | 31.00 | 31.00 | 31.00 | 31.00 | 31.00 |
| FKM #1 | | — | 68.00 | — | 68.00 | 68.00 | 68.00 |
| THV-220 (Dyneon) | | — | 1.00 | 1.00 | — | — | — |
| RF3-15-4 FKM #3 | | — | — | 68.00 | — | — | — |
| N-990 carbon black | | 20.00 | — | — | — | — | — |
| PVDF #2 (PVDF/CTFE copolymer) | | — | — | — | 1.00 | 1.00 | 5.00 |
| Carbowax PEG 400 | | — | — | — | — | — | — |
| Dyneon THV-500 | | 30.00 | — | — | — | — | — |
| FKM #2 | | 70.00 | — | — | — | — | — |
| TP-95 (di(butoxy-ethoxy-ethyl)adipate) | | — | 1.50 | 1.50 | — | 1.50 | — |
| Zinc stearate | | — | 0.70 | 0.70 | — | 0.70 | — |
| Vanfre AP-2 | | — | — | — | — | — | — |
| Struktol WB 222 | | — | — | — | — | — | — |
| Polar Minerals 9603 (talc, aminosilanized) | | — | 20.00 | — | 10.00 | 20.00 | 10.00 |
| Ensaco 250 Black Beads | | 7.50 | 11.00 | 11.00 | 11.00 | 11.00 | 11.00 |
| Ensaco 350 Black Beads | | | | | | | |
| Calcium hydroxide-USP | | 5.00 | 6.10 | 6.10 | 6.10 | 6.10 | 6.10 |
| StarMag CX-150 (MgO) | | — | 3.40 | 3.40 | 3.40 | 3.40 | 3.40 |
| Total: | | 132.50 | 142.70 | 122.70 | 130.50 | 142.70 | 134.50 |
| Calculated Specific Gravity: | | 1.917 | 1.873 | 1.933 | 1.918 | 1.959 | 1.912 |

| Rheological & Cure Properties | WG-7-29-3 | RF3-15-10 | RF3-15-4 | RF3-16-2 | RF3-15-13 | RF3-16-3 |
|---|---|---|---|---|---|---|
| ML | 11.70 | 13.60 | 11.00 | 13.50 | 13.40 | 13.30 |
| MH | 32.10 | 50.60 | 63.80 | 51.70 | 55.60 | 46.90 |
| ts2 | 3.58 | 4.13 | 3.93 | 3.75 | 4.25 | 6.93 |
| t'50 | 5.48 | 8.57 | 8.58 | 7.48 | 8.85 | 16.18 |
| t'90 | 7.83 | 13.38 | 12.12 | 11.28 | 14.72 | 21.52 |
| ODR initial torque | 41.50 | 59.40 | 65.80 | — | 60.90 | — |
| Cure system figure of merit [ts2/(t'90-ts2)] | 0.84 | 0.45 | 0.48 | 0.50 | 0.41 | 0.47 |

| Physical Properties | WG-7-29-33 #25 | RF3-15-10 #26 | RF3-15-4 #27 | RF3-16-2 #28 | RF3-15-13 #29 | RF3-16-3 #30 |
|---|---|---|---|---|---|---|
| Shore A Durometer | 92 | 96 | 96 | 93 | 96 | 95 |
| Tensile Strength, pounds/square inch (psi) | 1,856 | 1,669 | 1,733 | 1,770 | 1,712 | 2,019 |
| Elongation at break (%) | 283 | 155 | 142 | 191 | 173 | 144 |
| Stress at 100% Strain (psi) | 1,381 | 1,618 | 1,700 | 1,686 | 1,666 | 1,958 |
| Permeability to CM15 fuel blend 21C | 2.84E − 05 | 4.43E − 05 | 2.34E − 04 | 5.85E − 06 | 2.35E − 05 | 1.38E − 05 |
| Surface res., Maximum ohm-cm. (mean + 3 sig | 1.8E + 08 | no data | 2.5E + 08 | no data | no data | no data |
| Average surface res., ohm-cm. | 3.6E + 07 | 2.0E + 07 | 6.1E + 07 | no data | no data | no data |
| standard deviation resistance, ohm-cm | 4.9E + 07 | 2.9E + 07 | 6.4E + 07 | no data | no data | no data |
| Permeability relative to FKM/THV blend | 100% | 156% | 823% | 21% | 83% | 49% |

TABLE 5

FKM/PVDF Blends
This series reviews data from several different experiments.

Lab book number, recipe in parts per 100 polymer (phr)

| INGREDIENT | lab book #: | RF3-31-25 #31 | RF3-31-26 #32 | RF3-31-27 #33 | RF3-31-28 #34 | RF3-31-29 #35 | RF3-31-30 #36 |
|---|---|---|---|---|---|---|---|
| FC-2260 | | 68.00 | | | | | |
| FC-2152 | | | 68.00 | | | | |
| Dai-EI G999 | | | | 68.00 | | | |
| Dai-EI LT302 | | | | | 68.00 | 68.00 | |
| GFLT-502 | | | | | | | 68.0 |
| Hylar FXH (XPH-487) | | 32.0 | 32.00 | 32.00 | 32.00 | | 32.0 |
| Solef 31508 PDVF/CTFE copolymer | | | | | | 32.00 | |
| N-990 | | 25.00 | 25.00 | 2500 | 25.00 | 25.00 | 25.00 |
| Total | | 125.00 | 125.00 | 125.00 | 125.00 | 125.00 | 125.00 |
| Following ingredients added on mill | | | | | | | |
| MASTER Batch | | 125.00 | 125.00 | 125.00 | 125.00 | 125.00 | 125.00 |

TABLE 5-continued

FKM/PVDF Blends
This series reviews data from several different experiments.

| | | | | | | |
|---|---|---|---|---|---|---|
| Varox DCP-40KE HP | | | 1.00 | 1.00 | 1.00 | |
| TAIC-DLC-A (72%) | 3.50 | | 3.00 | 3.00 | 3.00 | 3.50 |
| Varox DBPH-50 | 3.50 | | | | | 3.50 |
| Flourocal H-20 | | 6.00 | | | | |
| StarMag CX-150 | | 3.00 | | | | |
| Total: | 132.00 | 134.00 | 129.00 | 129.00 | 129.00 | 132.00 |
| Calculated Specific Gravity: | | | | | | |

| Rheological & Cure Properties | RF3-31-25 | RF-31-26 | RF3-31-27 | RF3-31-28 | RF3-31-29 | RF3-31-30 |
|---|---|---|---|---|---|---|
| ML | 17.90 | 17.90 | 4.50 | 11.40 | 11.30 | 17.20 |
| MH | 54.30 | 45.20 | 69.80 | 70.90 | 63.50 | 57.70 |
| ts2 | 1.43 | 1.93 | 1.55 | 1.78 | 1.80 | 1.48 |
| t'50 | 2.17 | 3.03 | 2.60 | 3.00 | 2.97 | 2.22 |
| t'90 | 4.28 | 4.18 | 3.82 | 4.50 | 4.40 | 4.17 |
| ODR initial torque | 50.10 | 49.60 | 34.10 | 48.30 | 39.10 | 47.50 |
| Cure system figure of merit [ts2/(t'90-ts2)] | 0.50 | 0.85 | 0.68 | 0.65 | 0.69 | 0.55 |

| Physical Properties | RF3-31-25 | RF3-31-26 | RF3-31-27 | RF3-31-28 | RF3-31-29 | RF3-31-30 |
|---|---|---|---|---|---|---|
| TEAR C-DIE | 290 | 316 | 380 | 306 | 231 | 245 |
| Shore A Durometer | 92 | 91 | 94 | 92 | 87 | 89 |
| Tensile Strength, pounds/square inch (psi) | 2,214 | 1,585 | 1,867 | 1,751 | 1,577 | 2,088 |
| Elongation at break (%) | 251 | 373 | 139 | 222 | 313 | 210 |
| Stress at 100% Strain (psi) | 1,402 | 1,148 | 1,818 | 1,321 | 909 | 1,568 |

What is claimed is:

1. A moldable, extrudable, thermally crosslinkable composition of matter blend comprising about 50–99% by weight fluoropolymers, in which about 50–95% of the polymer content of the blend is an FKM fluoroelastomer and about 5–50% of the polymer content of the blend is one or more thermoplastic PVDF polymers or copolymers containing at least about 70% by weight vinylidene fluoride monomer units, and the crosslinked articles derived from processing and curing the subject composition of matter.

2. The composition of claim 1 comprising one or more PVDF/HFP copolymers at a total level between 10–45% by weight of the polymer content of the blend.

3. The composition of claim 1 comprising a PVDF/CTFE copolymer at a level between 10–45% by weight of the polymer content of the blend.

4. The composition of claim 2 comprising a PVDF/HFP copolymer at a level between 10–44.5% by weight of the polymer content of the blend and a minor portion of a PVDF/CTFE copolymer at a level between 0.5–5% of the polymer content of the blend.

5. The composition of claim 2 comprising a PVDF/HFP copolymer at a level between 10–44.5% by weight of the polymer content of the blend and a minor portion of a THV copolymer with a melting temperature below 150° C., at a level between 0.5–5% of the polymer content of the blend.

6. The composition of claim 1 further comprising one or more platy fillers selected from the group of such fillers consisting of mica, talc, clay, and delaminated graphite, to accomplish a low-permeability composition.

7. The composition of claim 6 wherein said platy filler is composed at least in part of mica, talc, or clay which has been treated with an aminosilane.

8. The composition of claim 2 comprising a PVDF/HFP copolymer at a level between 10–45% by weight of the polymer content of the blend, optionally a fluoroplastic processing aid at a level up to 5% by weight of the polymer, with the balance of the polymeric portion of the composition consisting of a high-fluorine FKM polymer, containing at least 71% by weight fluorine.

9. The composition of claim 1, further comprising at least two conductive fillers of different size and shape, to accomplish electrical resistivity below $10^6$ ohm-cm.

10. The composition of claim 9 wherein the conductive fillers comprise 2–4% by volume of a platy conductive filler selected from the group consisting of graphite powder, metal-coated mica, and metal flakes, plus 5–8% by volume of an electrically conductive carbon black which has at most 120 $m^2$/gram BET surface area.

11. The composition of claim 8 wherein the conductive fillers comprise 2–4% by volume of a platy conductive filler selected from the group consisting of graphite powder, metal-coated mica, and metal flakes, plus 5–8% by volume of an electrically conductive carbon black which has at most 120 $m^2$/gram BET surface area.

12. The composition of claim 9 further comprising a platy filler selected from the group consisting of mica, talc, clay, and delaminated graphite.

13. The composition of claim 10 further comprising a platy filler selected from the group consisting of mica, talc, clay, and delaminated graphite.

14. The composition of claim 12 in which said platy filler is composed at least in part of mica, talc, or clay which has been treated with an aminosilane.

15. The composition of claim 13 in which said platy filler is composed at least in part of mica, talc, or clay which has been treated with an aminosilane.

16. The composition of claim 1 further comprising at least one type of oligomeric poly-CTFE as a processing aid.

17. The composition of claim 8 further comprising an oligomeric poly-CTFE.

18. The composition of claim 1 wherein the FKM is a peroxide-crosslinkable elastomer, and the composition further comprises a free radical generating initiator and optionally a coagent.

19. The composition of claim 17 wherein the FKM is a peroxide-crosslinkable low-temperature FKM elastomer.

20. The composition of claim 19 wherein the FKM is a labile iodine-containing peroxide-crosslinkable FKM elastomer.

21. The composition of claim 20 wherein the FKM is a high-fluorine material with greater than 72% combined fluorine by weight.

22. The composition of claim 16 further comprising about 0.2–4 parts of a zinc salt of one or several fatty acids.

23. The composition of claim 5 comprising a PVDF/HFP copolymer at a level between 10–44.5% by weight of the polymer content of the blend, a conductive carbon black, and a minor portion of a THV copolymer with a melting temperature below 150° C., at a level between 0.5–5% of the polymer content of the blend.

* * * * *